United States Patent
Ochwat et al.

(10) Patent No.: US 7,036,361 B2
(45) Date of Patent: May 2, 2006

(54) METHOD AND DEVICE FOR CHECKING THE AIR NOISE OF A MOTOR VEHICLE

(75) Inventors: Michael Ochwat, Markgroeningen (DE); Herbert Horst, Kornwestheim (DE); Mario Moeller, Stuttgart (DE); Timo Mosel, Oyten (DE); Martin Ehinger, Karlsruhe (DE)

(73) Assignee: Dr. Ing h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/781,854

(22) Filed: Feb. 20, 2004

(65) Prior Publication Data
US 2004/0226379 A1 Nov. 18, 2004

(30) Foreign Application Priority Data
Feb. 20, 2003 (DE) ................. 103 07 182

(51) Int. Cl.
*G01M 9/04* (2006.01)
*G01M 9/06* (2006.01)

(52) U.S. Cl. ............................. 73/147; 73/583; 73/587
(58) Field of Classification Search ................. 73/587, 73/147, 583, 589, 599
See application file for complete search history.

(56) References Cited

U.S. PATENT DOCUMENTS

| 2,657,575 | A | * | 11/1953 | Allen ........................... 73/147 |
| 5,035,359 | A | * | 7/1991 | Yamada et al. ............. 239/502 |
| 5,435,175 | A | | 7/1995 | Kramer et al. ................ 73/147 |
| 5,568,404 | A | * | 10/1996 | Strumolo .................... 702/140 |
| 5,861,585 | A | * | 1/1999 | Van Every et al. ......... 181/224 |
| 6,088,521 | A | * | 7/2000 | Strumolo et al. ............... 703/8 |
| 6,550,332 | B1 | * | 4/2003 | Lee .............................. 73/583 |
| 6,748,800 | B1 | * | 6/2004 | Lacey, Jr. .................... 73/147 |
| 2002/0059832 | A1 | | 5/2002 | Lee .............................. 73/586 |

FOREIGN PATENT DOCUMENTS

| DE | 39 39 099 | 5/1991 |
| DE | 37 15 016 | 6/1993 |
| DE | 41 39 359 | 6/1993 |
| DE | 196 09 087 | 9/1997 |
| DE | 100 49 533 | 4/2002 |
| DE | 101 57 196 | 5/2002 |
| JP | 07260560 A * | 10/1995 |
| JP | 2000065690 A * | 3/2000 |

* cited by examiner

*Primary Examiner*—Hezron Williams
*Assistant Examiner*—Rose M. Miller
(74) *Attorney, Agent, or Firm*—Crowell & Moring LLP

(57) ABSTRACT

A method is used for checking the air noise of a motor vehicle, particularly of a passenger car, which air noise is generated by air flowing onto an outer skin of a vehicle body of the passenger car. In order to optimize this method, targeted air currents are applied by means of a blower to a stationary passenger car in areas where sealing devices extend between stationary vehicle body structures and movable vehicle body elements of the vehicle body, and the air noise occurring as a result of the air currents is measured subjectively and/or objectively. For the implementation of the method, a device is used in the case of which the blower comprising the outflow cross-section is a component of a flow device which is equipped with a blast nozzle for acting upon measuring points on the outer skin.

22 Claims, 6 Drawing Sheets

METHOD AND DEVICE FOR CHECKING THE AIR NOISE OF A MOTOR VEHICLE

BACKGROUND AND SUMMARY OF THE INVENTION

This application claims the priority of German Application No. 103 07 182.2 filed Feb. 20, 2003, the disclosure of which is expressly incorporated by reference herein.

The invention relates to a method and a device for checking the air noise of a motor vehicle.

Air noise is generated by a passenger car in operation, specifically by the flow around an outer skin of a vehicle body, in two fashions: First, by a turbulent boundary layer when the flow is adjacent to the outer skin, and secondly, by a steady and unsteady separation and reapplication of the flow from and to the outer skin respectively. Because of the turbulent boundary layer, an alternating pressure of the flow acts upon the surface of the outer skin which generates airborne noise (sound waves propagate in the gaseous air medium) as well as structure-borne noise (sound waves propagate in a solid body).

A wind tunnel (German Patent Document DE 41 39 359 A1, corresponding U.S. Pat. No. 5,435,175) is known which is equipped with an open-jet working section and with a wind tunnel nozzle which can be swivelled for generating a flow which can be varied in its direction while the wind tunnel is running. In addition, this wind tunnel can be equipped with acoustically effective devices which are integrated in the flow guidance. This has the purpose of lowering the sound pressure level to such an extent that the flow noise, which is a function of the direction of the air flow, can also be perceived and measured.

German Patent Document DE 39 39 099 A1 relates to a checking device for frontal radiator parts of a motor vehicle through which air can flow at different rates of air flow. In this case, a funnel is disposed in front of a radiator of the motor vehicle. The cross-section of the funnel widens toward the radiator and its outlet opening extends approximately flush with a contour of a cooling-air inlet opening. In addition, the checking device comprises a controllable blower which is provided in the vicinity of the inlet opening of the funnel.

It is an object of the invention to develop a method and a device for checking the air noise of a motor vehicle, particularly of a passenger car, by which the qualitative assessment of the passenger car with respect to air noise perceivable by vehicle occupants is further optimized. The method and the device should be distinguished by simplicity and an easy implementability.

According to the invention, this object is achieved by providing a method of checking air noise of a motor vehicle, particularly of a passenger car, which is generated by air flowing onto an outer skin of a vehicle body of the passenger car, comprising applying targeted air currents to a stationary passenger car in predetermined areas of the outer skin where sealing devices extend between stationary vehicle body structures and movable vehicle body elements of the vehicle body, and measuring the air noise occurring as a result of the air currents.

This object is also achieved by providing a device for carrying out the method referred to above, wherein the targeted air currents are generated by a flow device with a blower and a blast nozzle for acting on predetermined measuring points of the vehicle.

Further features and advantages of the preferred embodiments of the invention are described herein and in the claims.

Important advantages achieved by the invention are that, while the passenger car is standing, as a result of applying targeted air currents to defined areas of the outer skin, by means of the method, the air noise can be subjectively and/or objectively determined in a simple manner. As a result, high-expenditure test drives of the passenger car on test tracks or public roads and possible checks are avoided. When, in addition, retouching is required on a motor vehicle, this can be carried out more easily in connection with the method. Currents of air are applied to the outer skin by means of a blower, in which case, defined measuring points, for example, of a door of the vehicle body, are acted upon by the blower. A flow device is suitable for this purpose which has the blower comprising an outflow cross-section and a blast nozzle used for acting upon the measuring points. Preferably, a sound absorber is connected behind the blower, and a conveying hose is provided between the blast nozzle and the sound absorber. Finally, the blower, the sound absorber, the conveying hose and the blast nozzle can be combined to form a constructional unit.

An embodiment of the invention is illustrated in the drawing and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
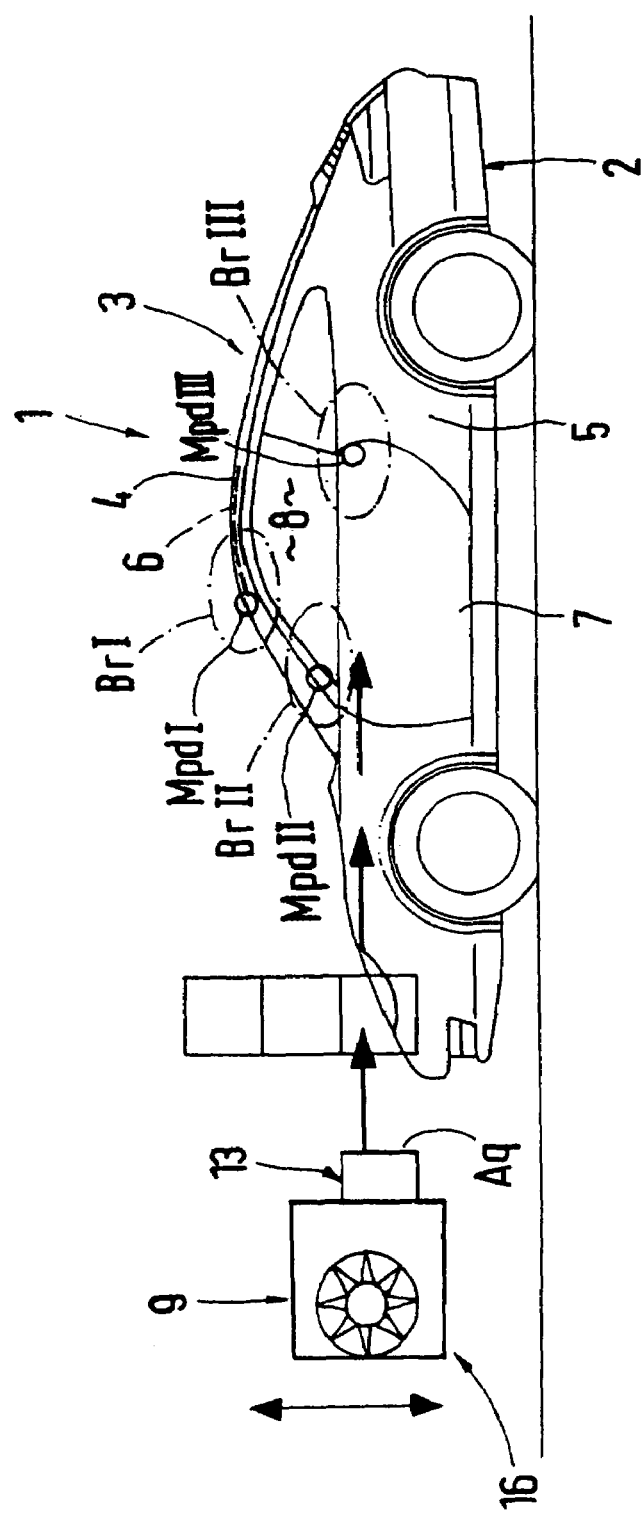
FIG. 1 is a lateral view of a stationary passenger car on which a method according to the invention is used by means of the device according to the invention.

A passenger car 1 has a vehicle body 2 with an outer skin 3 against which the air flows in the driving operation of the above-mentioned passenger car, whereby air noise is generated which reaches a vehicle occupant compartment by way of sealing devices between stationary vehicle body structures, such as a roof 4 and a side wall 5, and movable vehicle body elements, such as a sliding roof 6 and a door 7, as structure-born noise and as air-borne noise. In the corresponding definition, air noise of this type is perceived as disturbing and thus as impairing the quality mainly by occupants sitting in the vehicle occupant compartment 8. The following method is used for checking the air noise.

At the passenger car 1, which is not moving, targeted air currents are applied to areas, such as BrI, BrII and BrIII of the outer skin 3, where the sealing devices extend between the stationary vehicle body structures—roof 4, side wall 5—and movable vehicle body elements—sliding roof 6, door 7—, and the air noise occurring as the result of the air currents is subjectively measured by testing persons PiF and PaF inside the vehicle occupant compartment 8 or subjectively and/or objectively outside the passenger car 1.

The air currents are applied to the outer skin 3 of the vehicle 2 by means of a blower 9 provided or operated outside the passenger car 1. These currents are specifically applied to defined measuring points MpdI, MpdII and MpIII of the door 7 and of the sliding roof 6. The measuring points MpdI, MpdII and MpdIII can therefore be situated within the areas BrI, BrII and BrIII. In the case of this method, the sound pressure level, which is determined by means of an acoustic near-field measuring device 10, is used for the objective measurement.

Figure 8:
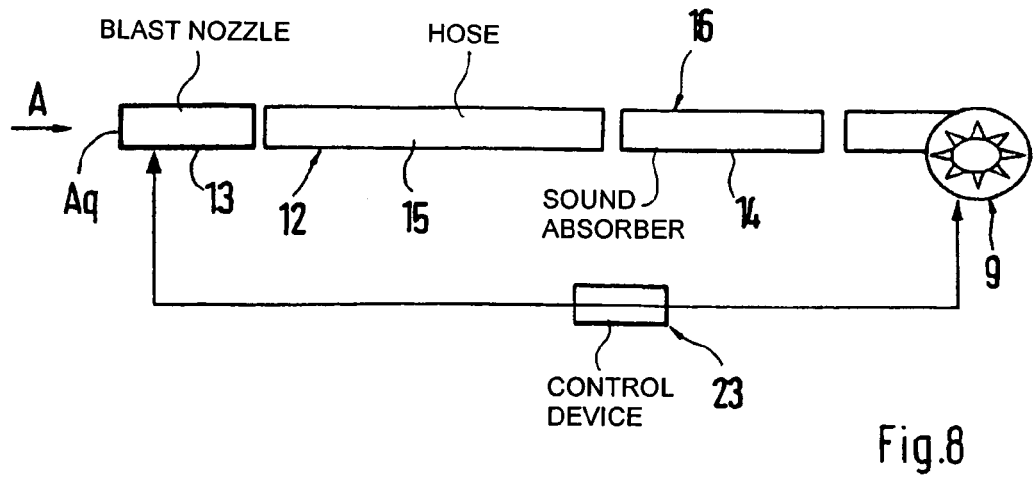
FIG. 8 is a schematic representation of the device for the implementation of the method according to the invention.

For the implementation of the above-described method, a device is suitable which comprises the blower 9 having an outflow cross-section Aq and is constructed as a flow device 12. The flow device 12 is equipped with a blast nozzle 13 which is used for acting upon the areas BrI, BrII and BrIII or the measuring points MpI, MpII and MpIII. A sound absorber 14 is connected behind the blower 9; and a, for example, flexible conveying hose 15—FIG. 8—is arranged between the blast nozzle and the sound absorber 14. The blower 9, the blast nozzle 13, the sound absorber 14 and the conveying hose 15 are combined to a constructional unit 16, which may be a component of a complete testing station for the determination of air noise.

Figure 2:
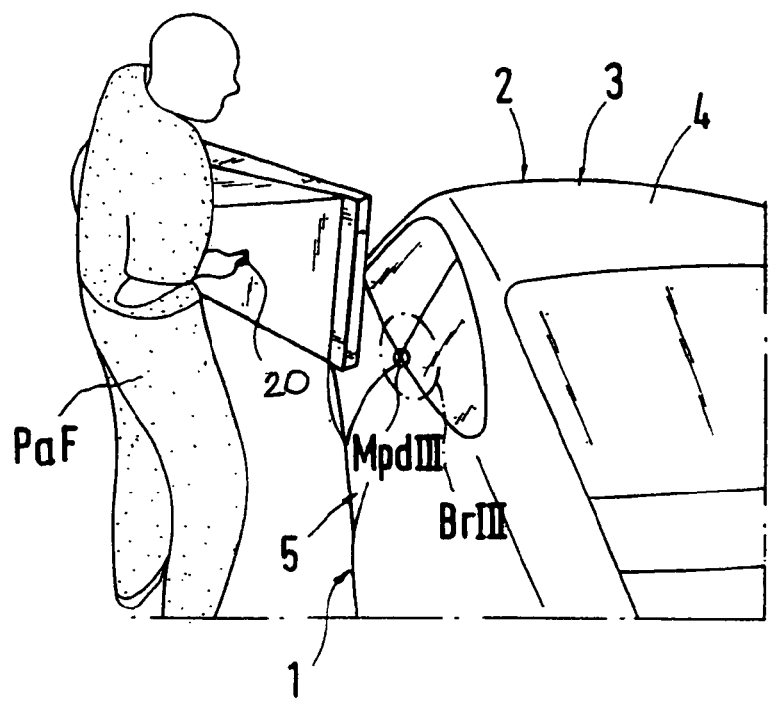
FIG. 2 is diagonal view from the left rear of the passenger car with a blast nozzle.
Figure 3:
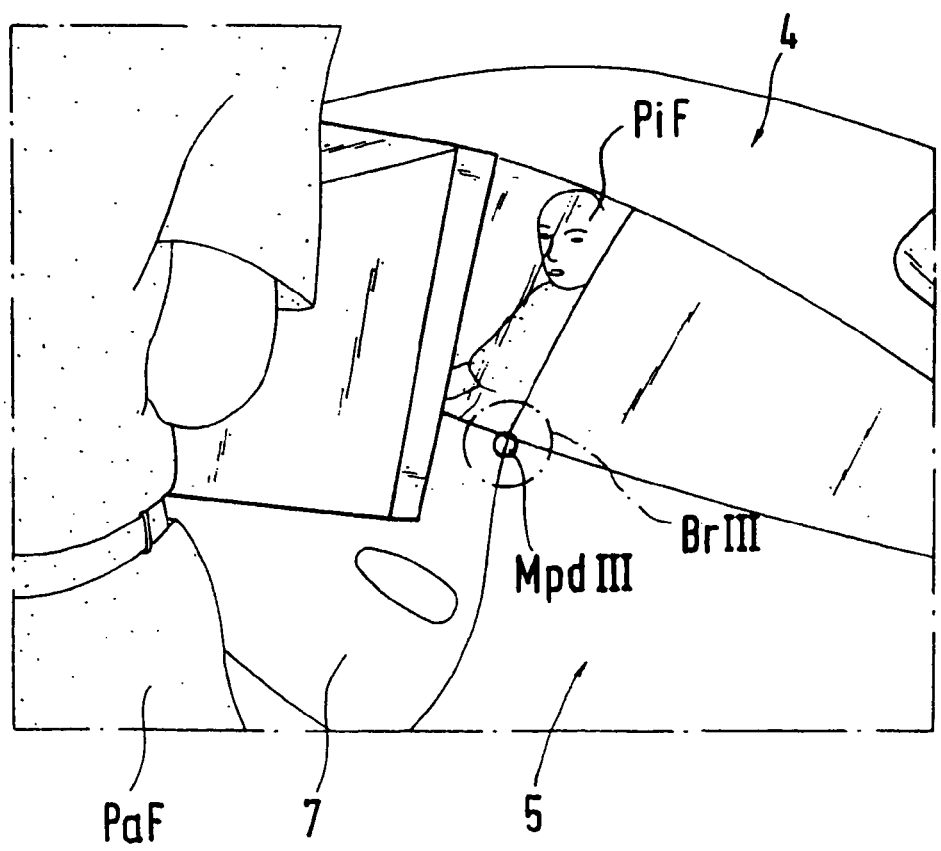
FIG. 3 is another diagonal view similar to FIG. 2.
Figure 4:
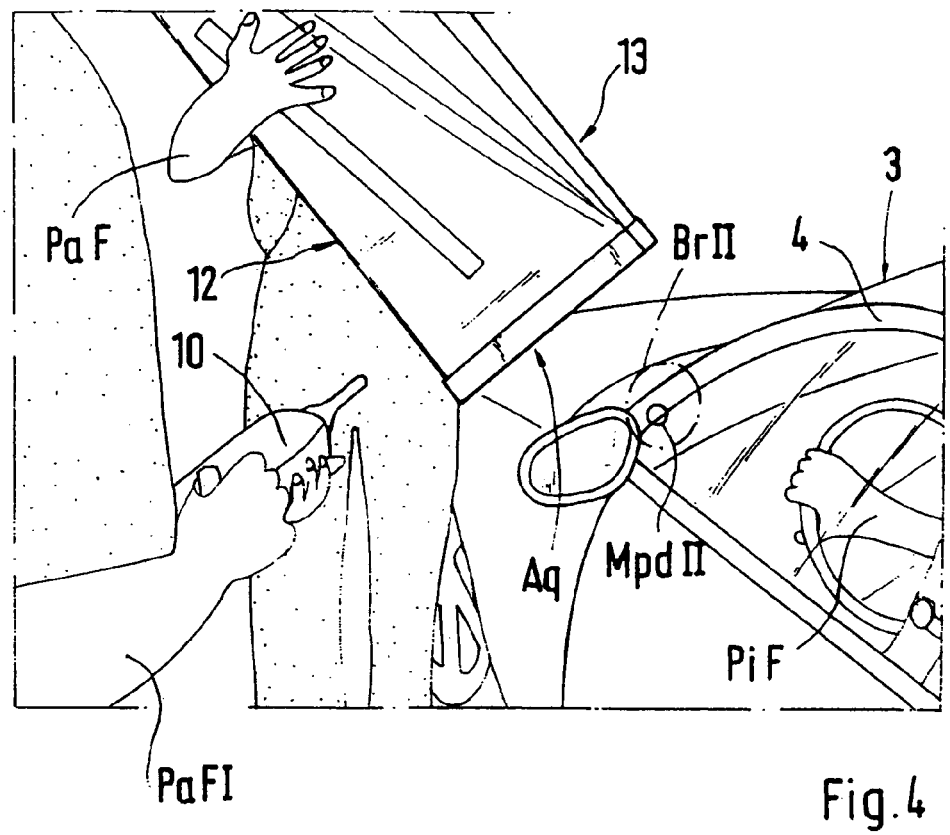
FIG. 4 is a diagonal view from the left rear of the windshield pillar of the passenger car with a blast nozzle and testing persons for the objective and subjective implementation of measuring methods for air noise.
Figure 5:
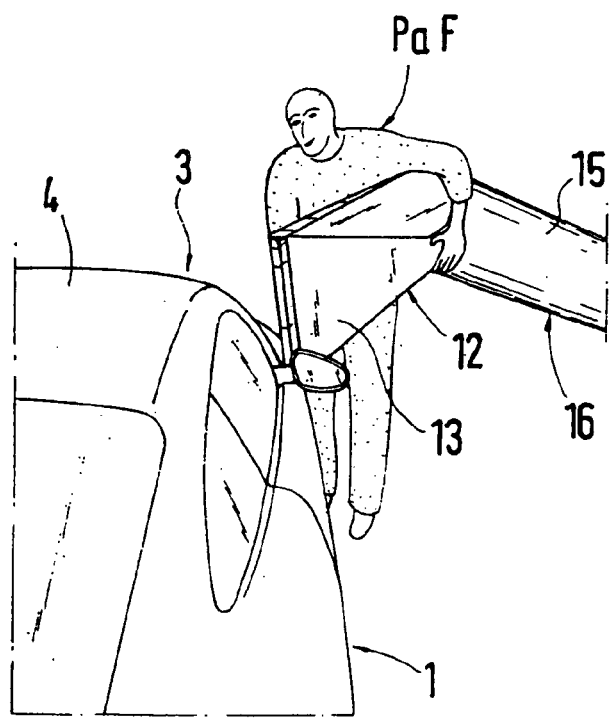
FIG. 5 is a diagonal view from the right rear of the passenger car with the blast nozzle.
Figure 6:
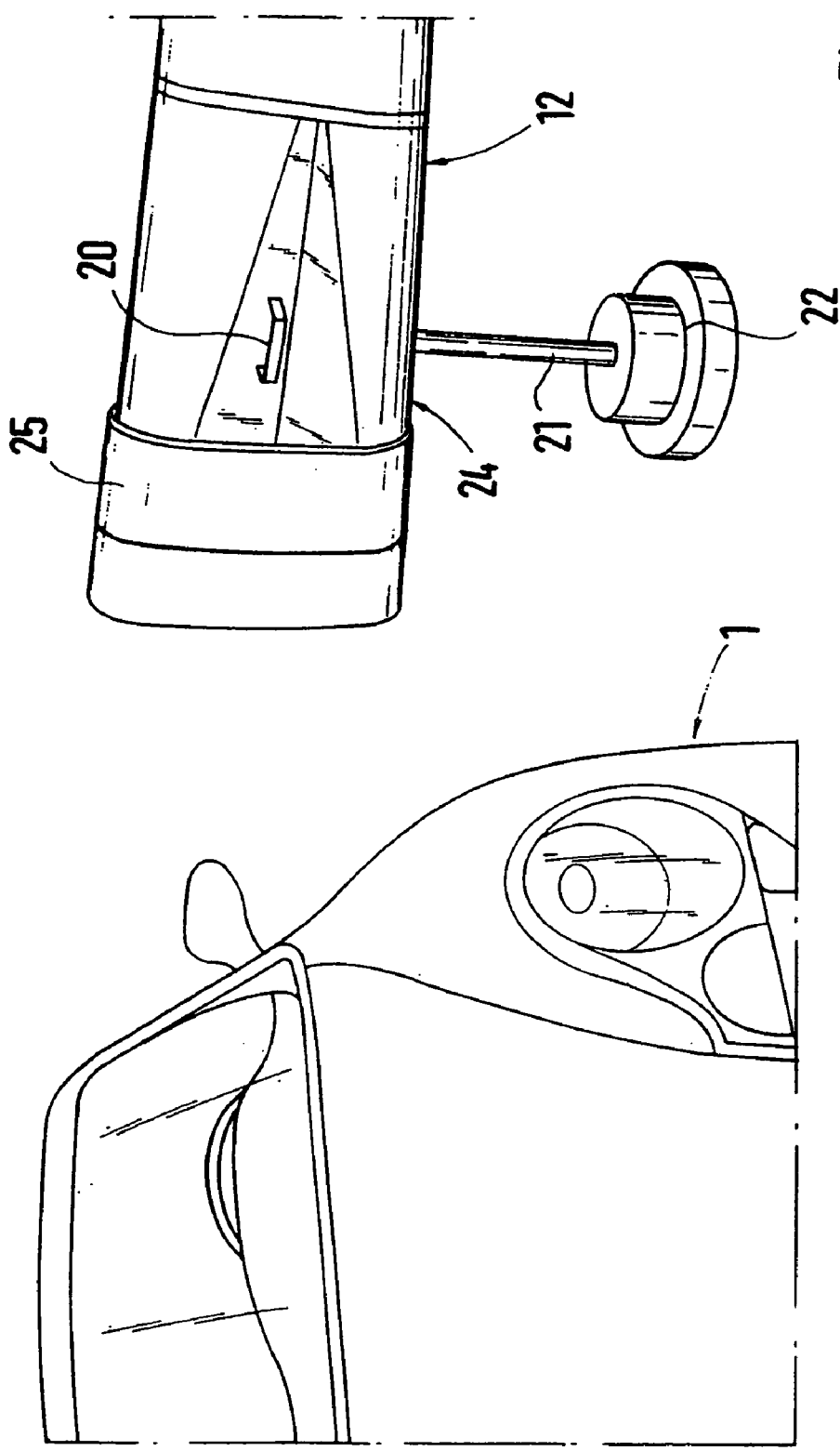
FIG. 6 is a diagonal view from the front of the passenger car with the blast nozzle.
Figure 9:
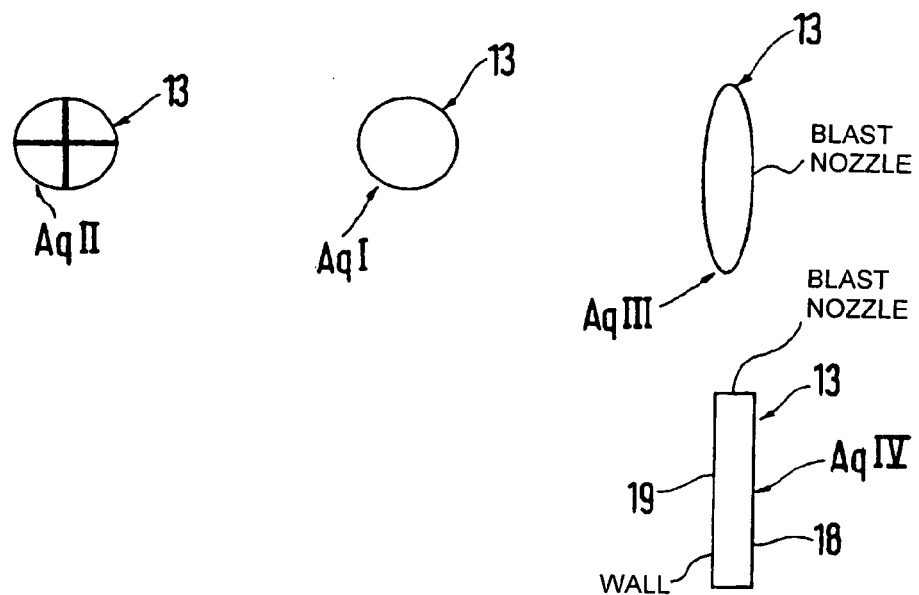
FIG. 9 is a view in the direction of the arrow A of FIG. 8 with different embodiments of outlet cross-sections of the blast nozzle.

FIG. 9 illustrates the outlet cross-sections AqI, AqII, AqIII, and AqIV of the blast nozzle 13. In this case, the outlet cross-sections AqI and AqII have a circular shape, the outlet cross-section AqII being provided with a grid-type insert 17 for a defined distribution of the air current. In contrast, the outlet cross-section AqIII has an oval shape and the outlet cross-section AqIV has a rectangular shape with parallel long walls 18 and 19, an optimized form of the outlet cross-section Aq of the blast nozzle 13 being, among other things, empirically definable. The blast nozzle 13 is constructed to be movable by the testing person PaF for being guided to the measuring points MpI, MpII and MpIII and is equipped with a handle 20—FIG. 2—, the testing person PiF checking the effects of the blast nozzle or of the blower 9 with respect to the air noise in the vehicle occupant compartment 8—FIGS. 2 and 3—. Another testing person PaFI simultaneously determines the air noise on the exterior side of the passenger car 1, specifically close to the vehicle by means of the near-field measuring device 10. However, the blast nozzle 13 may also be arranged on a support 21 which rests on a pedestal 22—FIG. 6. It is also conceivable that the blast nozzle 13 is mounted on a rope or a chain of a mobile lifting pulley block in a hanging manner, which, however, is not shown. The air flow of the blower 9 or its rate can be controlled by means of a control device 23 and displayed on a display which is not shown in detail.

Figure 7:
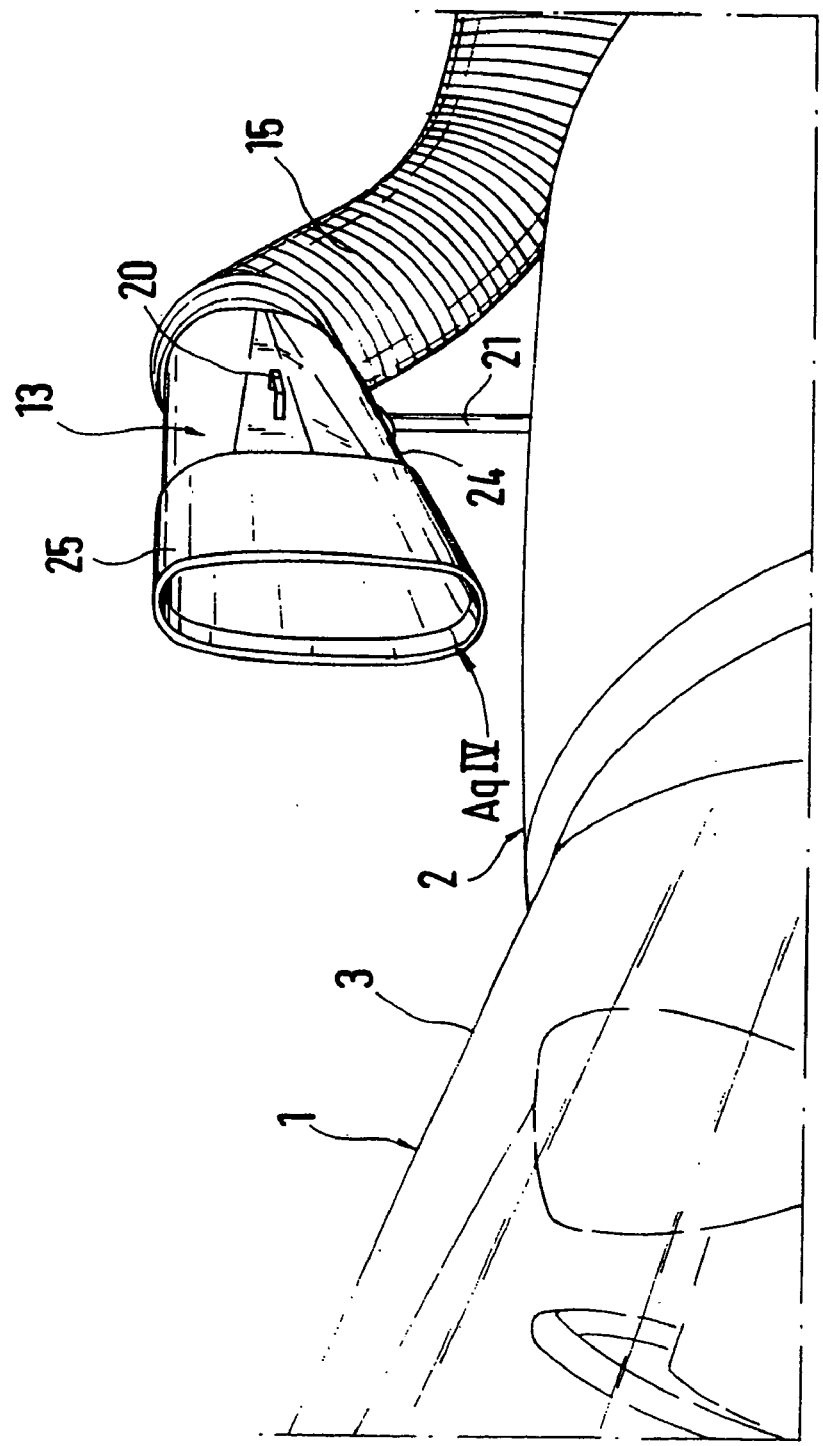
FIG. 7 is a diagonal view from the right of the front and the windshield of the passenger car with the blast nozzle.

Finally, the blast nozzle 13 is provided on its exterior side 24 with a covering 25 made of an elastic material which projects at least at a slight distance beyond the outlet cross-section Aq—FIG. 7—and prevents permanent damage to the passenger car 1 in the event of an unintentional impacting of the blow nozzle 13 on the outer skin 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of checking air noise of a motor vehicle which is generated by air flowing onto an outer skin of a vehicle body of the passenger car, comprising:
    applying targeted air currents to a stationary passenger car in predetermined areas of the outer skin where sealing devices extend between stationary vehicle body structures and movable vehicle body elements of the vehicle body, and
    measuring the air noise occurring as a result of the air currents.

2. Method according to claim 1, wherein said measuring includes subjectively measuring.

3. Method according to claim 1, wherein said measuring includes objectively measuring.

4. Method according to claim 1, wherein the air currents are applied to the outer skin by means of an external blower.

5. Method according to claim 4, wherein defined measuring points of a door of the vehicle body are acted upon by the blower.

6. Method according to claim 3, wherein the sound pressure level is used for the objective measuring of the air noise.

7. Method according to claim 6, wherein the sound pressure level is determined by means of an acoustic near-field measuring device.

8. Device for using the method according to claim 1, comprising:
    a blower with an overflow cross-section as a component of a flow device which is equipped with a blast nozzle for acting upon respective measuring points at the respective predetermined areas.

9. Device according to claim 8, wherein a sound absorber is connected behind the blower.

10. Device according to claim 9, wherein a conveying hose is provided between the blast nozzle and the sound absorber.

11. Device according to claim 10, wherein the blower, the sound absorber, the conveying hose and the blast nozzle are at least partially combined to a constructional unit.

12. Device according to claim 8, wherein an outlet cross-section of the blast nozzle has a circular shape.

13. Device according to claim 12, wherein the outlet cross-section is equipped with a grid-shaped insert.

14. Device according to claim 8, wherein the outlet cross-section of the blast nozzle has one of a rectangular shape, with approximately parallel walls and an oval shape.

15. Device according to claim 8, wherein the blast nozzle has a movable construction and is equipped with at least one handle.

16. Device according to claim 15, wherein the blast nozzle is disposed in a swivellable manner on a support with a pedestal.

17. Device according to claim 8, wherein an exterior side of the blast nozzle in an area of an outlet cross-section is provided, at least in sections, with a covering made of a flexible material.

18. Device according to claim 17, wherein the covering projects at least to a slight extent beyond the outlet cross-section.

19. Device according to claim 8, wherein the air current of the blower can be controlled by means of a control device.

20. Apparatus for checking air noise generated by air flowing over an outer skin of a passenger vehicle body, comprising:

means for applying targeted air currents to predetermined areas of an outer skin of a stationary passenger vehicle body, said predetermined areas being areas where sealing devices extend between adjacent vehicle body parts of the passenger vehicle body, and means for measuring air noise occurring as a result of the targeted air currents.

21. Apparatus for checking air noise generated by air flowing over an outer skin of a passenger vehicle, comprising:

a manually portable air nozzle operable to apply targeted air currents to predetermined areas of an outer skin of a stationary passenger vehicle body, said predetermined areas being areas where sealing devices extend between adjacent vehicle body parts of the passenger vehicle body, and noise measuring means operable to measure air noise occurring as a result of the targeted air currents.

22. Method for checking air noise generated by air flowing over an outer skin of a passenger vehicle body, comprising:

applying targeted air currents to predetermined areas of an outer skin of a stationary passenger vehicle body, said predetermined areas being areas where sealing devices extend between adjacent vehicle body parts of the passenger vehicle body, and measuring air noise occurring as a result of the targeted air currents.

* * * * *